United States Patent
Bie et al.

(10) Patent No.: US 10,887,586 B2
(45) Date of Patent: Jan. 5, 2021

(54) PICTURE ENCODING METHOD AND TERMINAL

(71) Applicant: HUAWEI TECHNOLOGIES CO., LTD., Guangdong (CN)

(72) Inventors: Xiaohui Bie, Shenzhen (CN); Shanxi Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/361,000

(22) Filed: Mar. 21, 2019

(65) Prior Publication Data

US 2019/0222836 A1 Jul. 18, 2019

Related U.S. Application Data

(63) Continuation of application No. PCT/CN2017/089888, filed on Jun. 24, 2017.

(30) Foreign Application Priority Data

Sep. 26, 2016 (CN) .......................... 2016 1 0851341

(51) Int. Cl.
*H04N 19/105* (2014.01)
*H04N 19/51* (2014.01)
(Continued)

(52) U.S. Cl.
CPC ......... *H04N 19/105* (2014.11); *H04N 19/119* (2014.11); *H04N 19/136* (2014.11);
(Continued)

(58) Field of Classification Search
CPC ............................ H04N 19/105; H04N 19/56
See application file for complete search history.

(56) References Cited

U.S. PATENT DOCUMENTS

| 6,160,848 A | 12/2000 | Sivan |
| 8,655,085 B2 | 2/2014 | Khawand et al. |

(Continued)

FOREIGN PATENT DOCUMENTS

| CN | 101594537 A | 12/2009 |
| CN | 102037730 A | 4/2011 |

(Continued)

*Primary Examiner* — Rowina J Cattungal
(74) *Attorney, Agent, or Firm* — Womble Bond Dickinson (US) LLP

(57) ABSTRACT

Application discloses a picture encoding method and a terminal. In the method, a terminal divides the plurality of pictures into N groups, wherein the dividing is based on reference information of each of a plurality of pictures. The terminal encodes the N groups of pictures, where the following steps are performed on each one of the N groups of pictures: selecting a first picture from a target group according to a preset rule, and encoding the first picture, where the first picture is a picture first encoded in the target group, and the target group is any one of the N groups of pictures; selecting a reference picture for a second picture from the target group, where the second picture is a picture in the target group other than the first picture; and performing motion estimation on the second picture by using the reference picture, to encode the second picture.

15 Claims, 7 Drawing Sheets

(51) Int. Cl.
*H04N 19/172* (2014.01)
*H04N 19/177* (2014.01)
*H04N 19/136* (2014.01)
*H04N 19/119* (2014.01)
*H04N 19/176* (2014.01)
*H04N 19/513* (2014.01)
*H04N 19/88* (2014.01)

(52) U.S. Cl.
CPC ......... *H04N 19/172* (2014.11); *H04N 19/176* (2014.11); *H04N 19/177* (2014.11); *H04N 19/51* (2014.11); *H04N 19/513* (2014.11); *H04N 19/88* (2014.11)

(56) References Cited

U.S. PATENT DOCUMENTS

| | | | |
|---|---|---|---|
| 2007/0160299 A1 | 7/2007 | Kajiwara et al. | |
| 2009/0274212 A1 | 11/2009 | Mizutani et al. | |
| 2009/0304077 A1* | 12/2009 | Wu | H04N 19/137 375/240.12 |
| 2011/0069757 A1* | 3/2011 | Ammu | H04N 19/172 375/240.12 |
| 2011/0261887 A1* | 10/2011 | Lee | H04N 19/43 375/240.16 |
| 2011/0293010 A1* | 12/2011 | Jeong | H04N 19/176 375/240.16 |
| 2012/0106852 A1 | 5/2012 | Khawand et al. | |
| 2012/0170651 A1* | 7/2012 | Shimizu | H04N 19/577 375/240.12 |
| 2014/0146887 A1* | 5/2014 | Watanabe | H04N 19/105 375/240.12 |
| 2014/0185947 A1* | 7/2014 | Guo | H04N 19/139 382/236 |
| 2015/0067471 A1 | 3/2015 | Bhardwaj et al. | |
| 2015/0350653 A1 | 12/2015 | Kim et al. | |
| 2015/0382007 A1 | 12/2015 | Bose | |
| 2016/0037082 A1* | 2/2016 | Wang | G06T 5/006 348/65 |
| 2016/0048973 A1* | 2/2016 | Takenaka | G06K 9/6202 382/199 |
| 2017/0238011 A1* | 8/2017 | Pettersson | H04N 19/105 375/240.12 |

FOREIGN PATENT DOCUMENTS

| | | |
|---|---|---|
| CN | 102521235 A | 6/2012 |
| CN | 105007412 A | 10/2015 |
| WO | 00/60847 A1 | 10/2000 |
| WO | WO-0060847 A1 * | 10/2000 ............. H04N 19/51 |

* cited by examiner

PICTURE ENCODING METHOD AND TERMINAL

CROSS-REFERENCE TO RELATED APPLICATIONS

This application is a continuation of International Application No. PCT/CN2017/089888, filed on Jun. 24, 2017, which claims priority to Chinese Patent Application No. 201610851341.9, filed on Sep. 26, 2016. The disclosures of the aforementioned applications are hereby incorporated by reference in their entireties.

TECHNICAL FIELD

The present invention relates to the field of computer technologies, and in particular, to a picture encoding method and a terminal.

BACKGROUND

With rapid development of electronic technologies, many terminals (for example, a mobile phone and a wearable device) each have a photographing function. Currently, a picture becomes an important manner in which people obtain information, and people get used to recording bits and pieces of life by using a picture and communicating and sharing by using a picture. With progress of technologies, a picture taken by a terminal through photographing has an increasingly high definition. Consequently, a data volume of each picture is also increasingly large.

A larger data volume of a picture requires higher storage costs. For example, one of two mobile phones of a same model has storage space of 32 G, the other has storage space of 64 G, and the mobile phone of 64 G is usually more expensive than the mobile phone of 32 G by RMB several hundreds or even several thousands. Additionally, a larger data volume of a picture indicates larger transmission costs of the picture. For example, when a picture having a relatively large data volume is uploaded to a network or downloaded from a network, a large quantity of bandwidth needs to be occupied, not only increasing load on the network but also increasing traffic overheads of a user.

In the prior art, to reduce storage costs and transmission costs of a picture, the picture is usually encoded to reduce a data volume of the picture, and an encoding manner is usually to independently encode each of a plurality of pictures. Such practice has a disadvantage that, independently encoding each picture requires generating information about each pixel of the picture, although a data volume after encoding is reduced compared with a data volume before encoding, a reduction quantity is relatively small.

SUMMARY

Embodiments of the present invention disclose a picture encoding method and a terminal, to improve a compression ratio.

According to a first aspect, an embodiment provides a picture encoding method. The method includes: dividing, by a terminal based on reference information of each of a plurality of pictures, the plurality of pictures into N groups, where the reference information of each picture in a same group satisfies a preset similarity condition, the reference information includes information that is used to describe a characteristic of the picture and that is generated when the picture is taken, and N is greater than or equal to 1; and encoding, by the terminal, the N groups of pictures, where the following steps are performed on each one of the N groups of pictures: selecting, by the terminal, a first picture from a target group according to a preset rule, and encoding the first picture, where the first picture is a picture first encoded in the target group, and the target group is any one of the N groups of pictures; selecting, by the terminal, a reference picture for a second picture from the target group, where the second picture is a picture in the target group other than the first picture; and performing, by the terminal, motion estimation on the second picture by using the reference picture, to encode the second picture.

By performing the foregoing steps, the terminal performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

In one embodiment, the characteristic of the picture includes at least one of a location, an angle, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture.

In one embodiment the selecting, by the terminal, a first picture from a target group according to a preset rule includes: selecting, by the terminal based on reference information of each picture in the target group, the first picture as the picture first encoded, where a characteristic of the first picture satisfies a preset centering condition, and the centering condition includes at least one of the following: location centering in a picture of the target group, angle value centering in a picture of the target group, or time centering in a picture of the target group.

That is, a picture whose characteristic is relatively centered is selected as the first picture as much as possible, so that similarities exist between the first picture and more pictures in the target group. In this way, many macroblocks in the first picture may be used to generate a motion vector of another picture in the target group.

In one embodiment, the selecting, by the terminal, a reference picture for a second picture from the target group includes: determining a coding order of each picture in the target group other than the first picture; and selecting, based on a characteristic of the second picture, the reference picture for the second picture from pictures whose coded orders are before that of the second picture, where a characteristic of the reference picture and the characteristic of the second picture satisfy a preset screening condition.

That is, a picture whose characteristic is closest to that of the first picture is selected as a reference picture of the first picture. In this way, when the first picture is encoded, more macroblocks in the first picture may be used to generate a motion vector with reference to a macroblock in the reference picture, so that encoded information of the first picture is as little as possible.

In one embodiment, the performing, by the terminal, motion estimation on the second picture by using the reference picture, to encode the second picture includes: determining an overlapping area between the reference picture and the second picture based on reference information of a reference picture and reference information of the second picture; determining, in the overlapping area of the reference picture, respective corresponding matching blocks for a plurality of macroblocks of the second picture, where each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture.

That is, an overlapping part between the first picture and the reference picture may be determined based on the reference information, and when a matching block is searched for later, the overlapping part is directly searched for the matching block instead of searching an entire part of the reference picture for the matching block, thereby improving efficiency of searching for the matching block.

According to a second aspect, an embodiment provides a terminal. The terminal includes a group division unit, a first selection unit, a second selection unit, and an encoding unit, where the group division unit is configured to divide, based on reference information of each of a plurality of pictures, the plurality of pictures into N groups, where the reference information of each picture in a same group satisfies a preset similarity condition, the reference information includes information that is used to describe a characteristic of the picture and that is generated when the picture is taken, and N is greater than or equal to 1; and the terminal is configured to encode the N groups of pictures by using a first selection unit, a second selection unit, and an encoding unit, and when any one of the N groups of pictures is encoded, the first selection unit is configured to select a first picture from a target group according to a preset rule, and encode the first picture, where the first picture is a picture first encoded in the target group, and the target group is any one of the N groups of pictures; the second selection unit is configured to select a reference picture for a second picture from the target group, where the second picture is a picture in the target group other than the first picture; and the encoding unit is configured to perform motion estimation on the second picture by using the reference picture, to encode the second picture.

By running the foregoing units, the terminal performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

It should be noted that, the terminal provided in this embodiment of the present invention includes but is not limited to the group division unit, the first selection unit, the second selection unit, and the encoding unit in the foregoing second aspect, and functions of the group division unit, the first selection unit, the second selection unit, and the encoding unit in the foregoing second aspect include but are not limited to the foregoing functions. The terminal may include units/modules configured to perform the picture encoding method described in the foregoing first aspect or any optional implementation of the foregoing first aspect to perform the picture encoding method described in the foregoing first aspect or any optional implementation of the foregoing first aspect.

For details of a description of a technical effect of the second aspect, refer to a related description of a technical effect of the first aspect or any optional implementation of the first aspect. Details are not described herein again.

According to a third aspect, an embodiment provides a terminal. The terminal includes a processor, a memory, and a system bus. The memory is configured to store a computer executable instruction, the processor and the memory are connected to each other by using the system bus, and when the terminal runs, the processor executes the computer executable instruction stored in the memory, so that a computer performs the picture encoding method according to the first aspect or any optional implementation of the first aspect.

For details of a description of a technical effect of the third aspect, refer to a related description of a technical effect of the first aspect or any optional implementation of the first aspect. Details are not described herein again.

According to a fourth aspect, an embodiment further provides a computer storage medium. The storage medium may be non-volatile. That is, content is not lost after power-off. The storage medium stores a software program, the software program includes an instruction, and when read and executed by one or more processors (for example, a processor in the terminal), the software program may implement the method provided in the first aspect or any implementation of the first aspect.

By implementing the embodiments of the present invention, the terminal performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

BRIEF DESCRIPTION OF DRAWINGS

Accompanying drawings that need to be used in the background or embodiments are simply described below.

DESCRIPTION OF EMBODIMENTS

The following describes the technical solutions in the embodiments of the present invention with reference to the accompanying drawings in the embodiments of the present invention.

An encoding method provided in the embodiments of the present invention is mainly applied to a terminal device. The terminal may also be referred to as User Equipment (UE), a Mobile Station (MS), a mobile terminal, or the like. Optionally, the terminal may have a capability of communicating with one or more core networks through a Radio Access Network, (RAN). For example, the terminal may be a mobile phone (or referred to as a "cellular" phone), or a computer with mobility. For example, the terminal may also be a portable, pocket-sized, handheld, computer built-in, or in-vehicle mobile apparatus. It should be understood that, in addition to the terminal device, an encoding method provided in the embodiments of the present invention may also be applied to another type of computer system.

Figure 1:
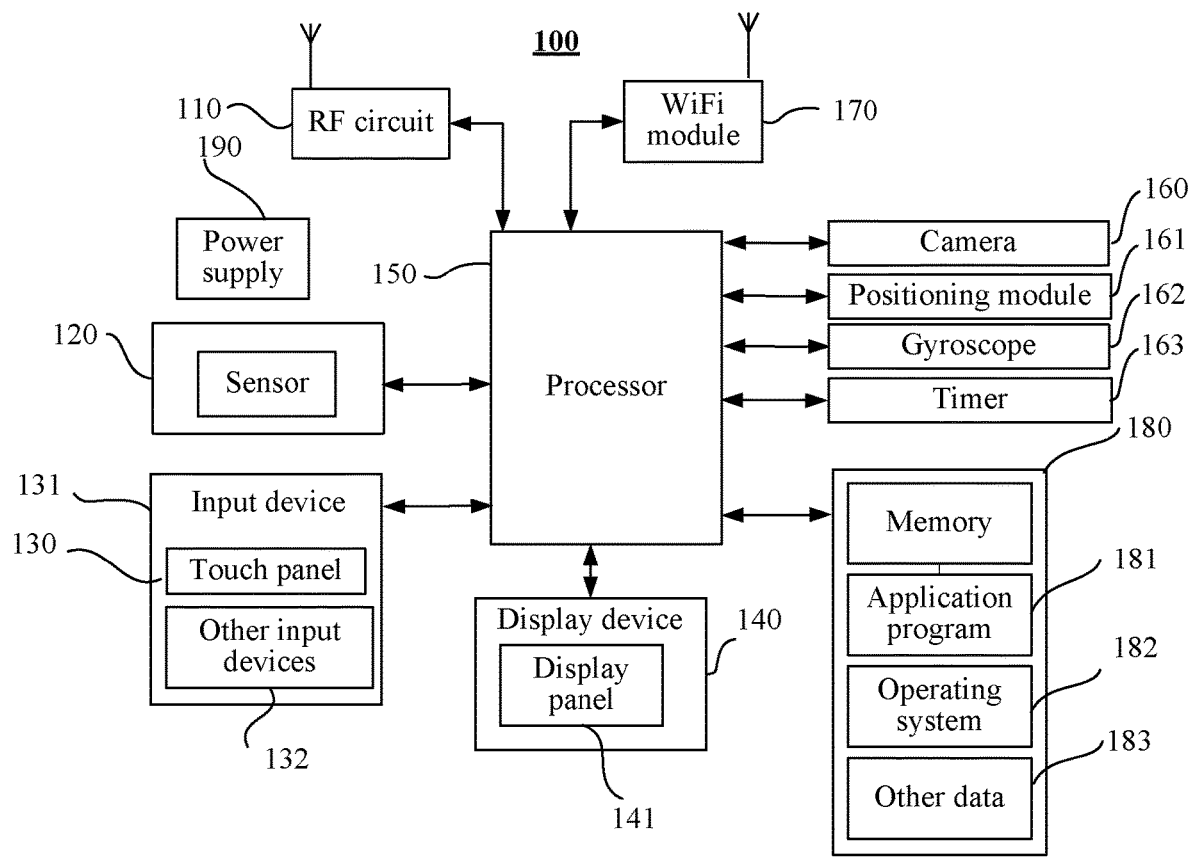
FIG. 1 is a schematic structural diagram of a terminal according to an embodiment of the present invention.

Referring to FIG. 1, FIG. 1 is a schematic structural diagram of a terminal 100 to which an embodiment of the present invention is applied. The terminal 100 includes a memory 180, a processor 150, and a display device 140. The memory 180 stores a computer program, and the computer program includes an operating system program 182, an application program 181, and the like. The processor 150 is configured to read the computer program in the memory 180, and then perform a method defined by the computer program. For example, the processor 150 reads the operating system program 182, thereby running an operating system on the terminal 100 and implementing various functions of the operating system, or reads one or more application programs 181, thereby running an application on the terminal.

The processor 150 may include one or more processors. For example, the processor 150 may include one or more central processing units. When the processor 150 includes a plurality of processors, the plurality of processors may be integrated on a same chip, or may respectively be independent chips. One processor may include one or more processing cores. In each of the following embodiments, a plurality of cores are used as an example to perform description, but a picture encoding method provided in the embodiments of the present invention may also be applied to a single-core processor.

Additionally, the memory 180 further stores other data 183 other than the computer program, the other data 183 may include data generated after the operating system program 182 or the application program 181 is run, and the data includes system data (for example, a configuration parameter of the operating system) and user data. For example, encoded information generated after the terminal encodes a picture may be considered as the user data.

The memory 180 usually includes an internal memory and an external memory. The internal memory may be a random access memory (RAM), a read-only memory (ROM), a cache, or the like. The external memory may be a hard disk, an optical disk, a USB flash drive, a floppy disk, a tape drive, or the like. The computer program is usually stored in the external memory, and before performing processing, the processor loads the computer program from the external memory to the internal memory. A picture in this embodiment of the present invention may be stored in the external memory, and when the picture needs to be encoded, the picture that needs to be encoded may be first loaded to the internal memory.

The operating system program 182 includes the computer program that may implement the picture encoding method provided in the embodiments of the present invention, so that the operating system may be equipped with a picture encoding function provided in the embodiments of the present invention after the processor 150 reads the operating system program 182 and runs the operating system. Further, the operating system may open a call interface of the picture encoding function to an upper-layer application, and after the processor 150 reads the application program 181 from the memory 180 and runs the application, the application may call, by using the call interface, the picture encoding function provided in the operating system, thereby encoding the picture.

The terminal 100 may further include an input device 130, configured to receive digital information, character information, or a contact touch operation/non-contact gesture that is input, and generate a signal input and the like related to user setting and function control of the terminal 100. Specifically, in this embodiment of the present invention, the input device 130 may include a touch panel 131. The touch panel 131, also referred to as a touchscreen, may collect a touch operation performed by a user on or nearby the touch panel 131 (for example, an operation performed by the user on the touch panel 131 or near the touch panel 131 by using any suitable object or accessory such as a finger or a stylus), and drive a corresponding connection apparatus based on a preset program. Optionally, the touch panel 131 may include two parts: a touch detection apparatus and a touch controller. The touch detection apparatus detects a touch direction of the user, detects a signal generated from the touch operation, and transfers the signal to the touch controller. The touch controller receives touch information from the touch detection apparatus, converts the touch information into touch point coordinates, and then sends the touch point coordinates to the processor 150. Moreover, the touch controller can receive and execute a command sent from the processor

150. For example, the user taps a virtual key by using a finger on the touch panel 131, the touch detection apparatus detects this signal brought by this tap and then transfers the signal to the touch controller, the touch controller then converts this signal into coordinates and sends the coordinates to the processor 150, and the processor 150 performs an operation on the picture such as group division, selection, or encoding based on the coordinates and a type (tap or double tap) of the signal, and finally displays an encoding result on a display panel 141.

The touch panel 131 may be implemented in a plurality of types such as a resistive type, a capacitive type, infrared, and a surface acoustic wave. Besides the touch panel 131, the input unit 130 may further include other input devices 132. The other input devices 132 may include, but is not limited to, one or more of a physical keyboard, a function key (for example, a volume control key or a switch key), a track ball, a mouse, a joystick, and the like.

The terminal 100 may further include the display device 140, and the display device 140 includes the display panel 141, configured to display information entered by the user or information provided to the user, various menu interfaces of the terminal 100, and the like. In this embodiment of the present invention, the display panel 141 is mainly configured to display an encoding result after picture encoding, and display information such as the picture in this embodiment of the present invention. The display device 140 may include the display panel 141. Optionally, the display panel 141 may be configured in a form such as a Liquid Crystal Display (LCD) or an Organic Light-Emitting Diode (OLED). In some other embodiments, the touch panel 131 may cover the display panel 141, to form a touch display screen.

Besides the foregoing, the terminal 100 may further include a power supply 190 configured to supply power to another module, a camera 160 configured to take a photograph or a video, a positioning module (for example, a GPS) 161 for obtaining a geographic location of the terminal, a gyroscope 162 for obtaining a placement gesture (for example, an angle or a direction) of the terminal, and a timer 163 for recording time. The picture used in the encoding process of this embodiment of the present invention may be taken by using the camera 160. The terminal 100 may further include one or more sensors 120 such as an acceleration sensor or a light sensor. The terminal 100 may further include a Radio Frequency (RF) circuit 110, configured to perform network communication with a wireless network device, and may further include a WiFi module 170, configured to perform WiFi communication with another device.

Figure 2:
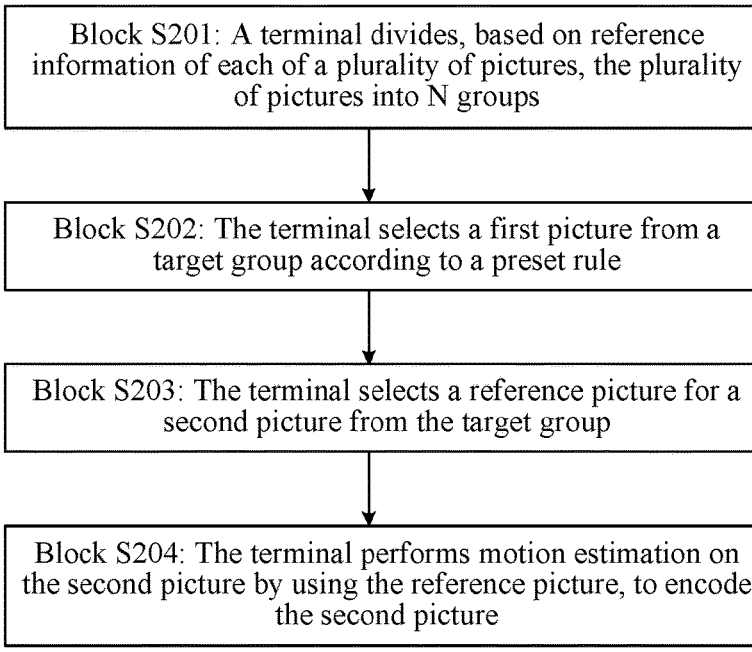
FIG. 2 is a schematic flowchart of a picture encoding method according to an embodiment of the present invention.

Referring to FIG. 2, FIG. 2 is a schematic flowchart of a picture encoding method according to an embodiment of the present invention. The method may be implemented by the foregoing terminal 10, and the processor 150 of the terminal 100 calls the program in the memory 180, to perform the following operations.

Block S201: A terminal divides, based on reference information of each of a plurality of pictures, the plurality of pictures into N groups.

Specifically, pictures that the plurality of pictures are specifically are temporarily not limited in this embodiment of the present invention. Optionally, the plurality of pictures are pictures in a designated folder. For example, if pictures taken by the terminal by using the camera 160 configured on the terminal are stored in a designated folder, the plurality of pictures are at least two pictures in the designated folder. Each picture in this embodiment of the present invention corresponds to reference information, and the reference information includes information that is used to describe a characteristic of the picture and that is generated when the picture is taken. For example, the characteristic may be information such as time, an angle, or a location when the picture is taken. A timer may be configured on a picture taking device, so that the device may generate, based on the timer, time when the picture is taken. A device that can obtain an angle (or a direction) such as a gyroscope may be configured on the device, so that the device may obtain, by using the device such as the gyroscope, an angle of the device when the picture is taken. The gyroscope herein may be a directional gyroscope, an angle measured by the directional gyroscope may be an angle by which a rotor shaft of the directional gyroscope offsets relative to a zero direction designated in advance, and the angle herein may include angles in a plurality of dimensions. The gyroscope may further be a rate gyroscope, the rate gyroscope is configured to measure an angular velocity, and an angle may be calculated by performing integral on the angular velocity. Additionally, a positioning device such as a Global Positioning System (GPS), a Galileo satellite navigation system, or a Compass Navigation Satellite System may be configured on the device, so that the device may obtain a location of the device when the picture is taken. The terminal in this embodiment of the present invention may be a picture taking device. When a picture is taken by a device other than the terminal, the taken picture may be a picture that is taken and sent by the other device and that is received by using a communications module such as the wireless device circuit 110 or the WiFi module 170.

The terminal may classify the plurality of pictures based on reference information of each picture. An overall idea is that pictures whose reference information satisfies a preset similarity condition are divided into a same group. For convenience of subsequent description, groups obtained through division may be referred to as N groups, and N is greater than 0. How to determine that reference information of each picture satisfies the similarity condition is described below.

For example, if the reference information includes the foregoing time, when a difference between time of two pictures is less than a pre-configured time threshold, the two pictures are classified into a same group. For another example, if the reference information includes the foregoing angle, when a difference between angles of two pictures is less than a pre-configured angle threshold, the two pictures are classified into a same group. For another example, if the reference information includes the foregoing location, when a distance between locations of two pictures is less than a pre-configured distance threshold, the two pictures are classified into a same group. A reason of such practice lies in that, if a time interval at which a user takes two pictures is relatively short, time angles at which a user takes two pictures are relatively close, or locations at which a user takes two pictures are relatively close, the two pictures are likely taken by the user by photographing a same scene or neighboring scenes, and have much similar content. Therefore, the two pictures satisfy the similarity condition.

Figure 3:
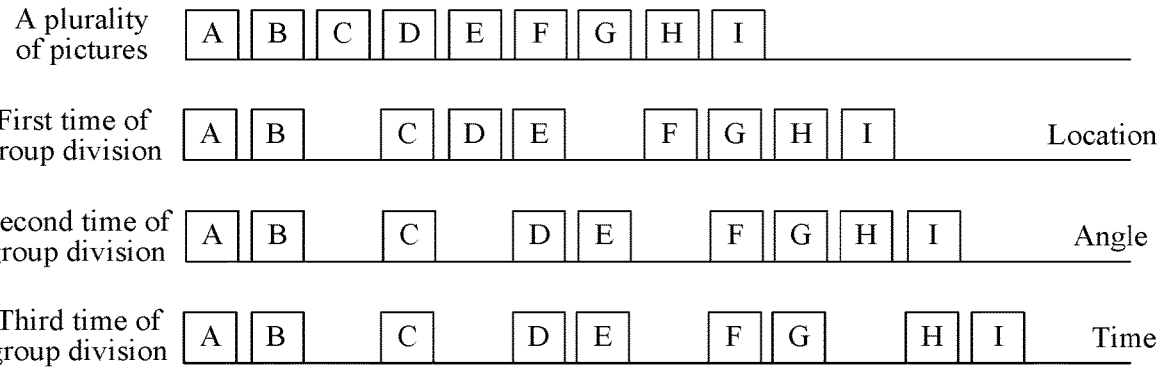
FIG. 3 is a schematic diagram of a scenario of picture group division according to an embodiment of the present invention.

Optionally, the reference information includes the foregoing time, angle, and location. If a distance indicated by locations of two pictures is less than a preset distance threshold, a difference between angles is less than a preset angle threshold, and a difference between time is less than a preset time threshold, it is considered that the two pictures are generated by a user by photographing a same scene or neighboring scenes and have much similar content. Therefore, the two pictures satisfy the similarity condition. For a process of analyzing time, angles, and locations of two pictures, refer to FIG. 3. In FIG. 3, the plurality of pictures include pictures A to I. A first time of group division is group division based on the foregoing location. Because a distance generated between a location of the picture A and a location of the picture B is less than a preset distance threshold, a distance generated between locations of any two of the picture C, the picture D, and the picture E is less than the distance threshold, and a distance generated between locations of any two of the picture F, the picture G, the picture H, and the picture I is less than the distance threshold, the picture A and the picture B are classified into a same group, the picture C, the picture D, and the picture E are classified into a same group, and the picture F, the picture G, the picture H, and the picture I are classified into a same group. A second time of group division is further group division based on the foregoing angle based on the first time of group division. Because a difference between angles of the picture A and the picture B is less than a preset angle threshold, the picture A and the picture B may be further divided into a same group during the second time of group division. Because a difference between angles of the picture D and the picture E is less than the angle threshold, and a difference between angles of the picture C and the picture D and a difference between angles of the picture C and the picture E are not less than the angle threshold, this group of the picture C, the picture D, and the picture E needs to be divided into two groups, where one group includes the picture C, and the other group includes the picture D and the picture E. Because a difference between angles of any two of the picture F, the picture G, the picture H, and the picture I is less than the angle threshold, the picture F, the picture G, the picture H, and the picture I are kept in a same group. A third time of group division is further group division based on the foregoing time based on the second time of group division. Because a difference between time of the picture A and the picture B is less than a preset time threshold, the picture A and the picture B are kept in a same group. Because a difference between time of the picture D and time of the picture E is less than the time threshold, the picture D and the picture E are kept in a same group. Because in the picture F, the picture G, the picture H, and the picture I, a difference between time of the picture F and time of the picture G is less than the time threshold, a difference between time of the picture H and time of the picture I is less than the time threshold, and a difference between time of any two other pictures is not less than the time threshold, the picture F and the picture G are classified into a same group, and the picture H and the picture I are classified into a same group. After the foregoing process, the picture A and the picture B are divided into a same group, the picture C is a group, the picture D and the picture E are divided into a same group, the picture F and the picture G are divided into a same group, the picture H and the picture I are divided into a same group, and correspondingly N is equal to 5. It should be noted that, group division performed on a plurality of pictures sequentially with reference to the three characteristics, namely, a location, an angle, and time is described above by using an example. In actual application, another situation may further exist for a reference order of the characteristics during picture group division.

Further, the terminal needs to encode the N groups of pictures. Specifically, blocks S202, S203, and S204 are performed on each one of the N groups of pictures, and the blocks are described as follows:

Block S202: The terminal selects a first picture from a target group according to a preset rule, and encodes the first picture, where the first picture is a picture first encoded in the target group, and the target group is any one of the N groups.

Specifically, each of the N groups of pictures needs to be encoded. In this embodiment of the present invention, any one of the N groups is selected as an example to perform description, and the selected group may be referred to as the target group. Each group of pictures obtained through division in this embodiment of the present invention is equivalent to a Group of Pictures (GOP) in an existing video encoding technology. Therefore, before a picture in the target group is encoded, a picture first encoded needs to be determined, and the picture first encoded is equivalent to a key frame (that is, a frame I) in the GOP. When the picture first encoded is encoded, another picture may not be referred to, but when a picture in the target group other than the picture first encoded is encoded, the picture first encoded may be directly or indirectly referred to. Therefore, the picture first encoded is relatively important, and a rule is usually preset to select a picture having much repeated content with most other pictures as the picture first encoded. For convenience of description, the determined picture first encoded may be referred to as the first picture.

In an optional solution, the first picture is a picture that is taken at a foremost time in the target group.

Figure 4:
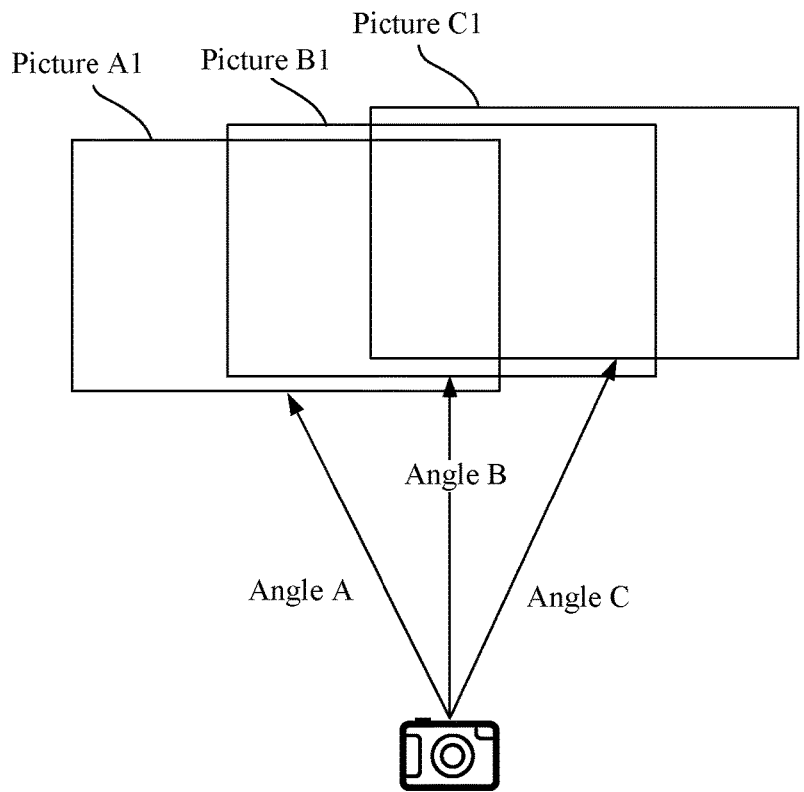
FIG. 4 is a schematic diagram of a scenario of taking photographs from different angles according to an embodiment of the present invention.
Figure 5:
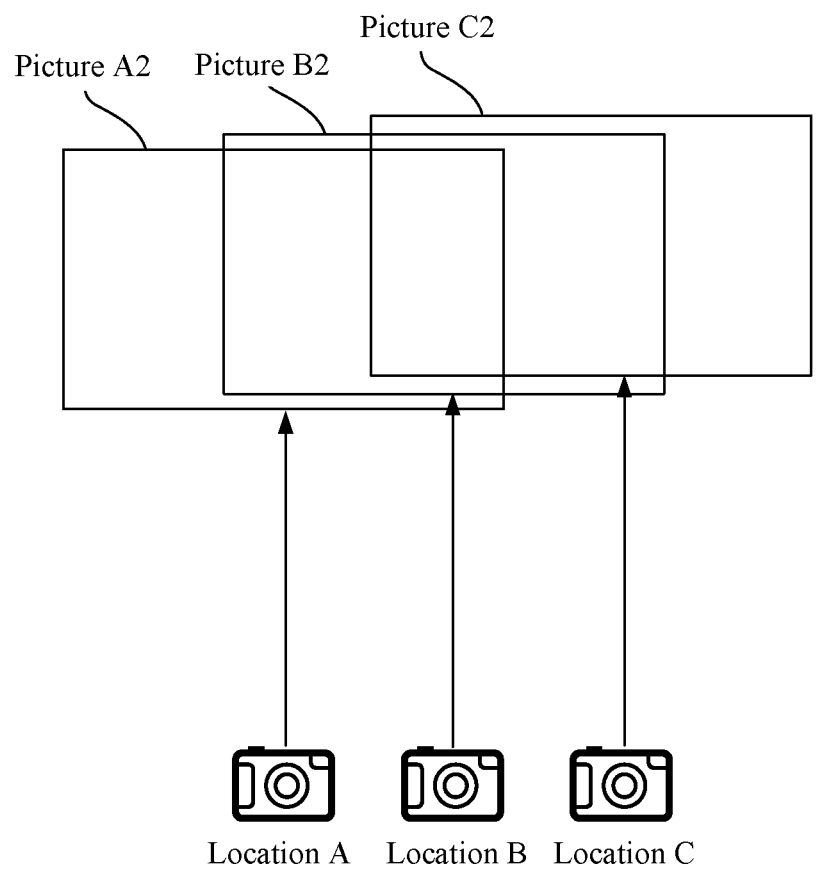
FIG. 5 is a schematic diagram of a scenario of taking photographs at different locations according to an embodiment of the present invention.

In another optional solution, the selecting, by the terminal, a first picture from a target group according to a preset rule is specifically: selecting, by the terminal based on reference information of each picture in the target group, the first picture as the picture first encoded, where a characteristic of the first picture satisfies a preset centering condition. It should be noted that, because reference information corresponding to each picture is used to describe a characteristic of the picture, the picture first encoded may be selected based on the characteristic of the picture. Specifically, a picture whose characteristic satisfies the preset centering condition is used as the picture first encoded. It should be noted that, regardless of whether the characteristic is time, an angle, a location, or other information, the characteristic may be finally quantized by using a specific value. After quantization, a parameter embodying a centering concept, such as a median or an average of these characteristics may be calculated. Therefore, if a picture of these pictures whose characteristic is closest to the parameter embodying the centering concept, the picture may be selected as the picture first encoded. Optionally, when the characteristic includes the foregoing time, the pictures may be first ranked based on time values of the pictures, and a picture centered after ranking may be selected as the picture first encoded. Optionally, when the characteristic includes the foregoing angle, the pictures may be first ranked based on angle values of the pictures, and a picture centered after ranking may be selected as the picture first encoded. As shown in FIG. 4, the user respectively takes a picture A1 at an angle A, takes a picture B1 at an angle B, and takes a picture C1 at an angle C by using the terminal. From the perspective of angle values, a value of the angle B is between the angle A and the angle C. Therefore, the picture B1 taken at the angle B is selected as the picture first encoded. Optionally, the characteristic includes the foregoing location. Longitude values of locations of the pictures may be first ranked, and a longitude centered after ranking is a target longitude. Latitude values of the locations of the pictures are ranked, and a latitude centered after ranking is a target latitude. A location indicated by the target latitude and the target longitude is a target location, and if a location of a picture is closest to the target location, the picture is selected as a picture first encoded. As shown in FIG. 5, the user respectively takes a picture A2 at a location A, takes a picture B2 at a location B, and takes a picture C2 at a location C by using the terminal, and the location B is closest to a target location. Therefore, the picture B2 taken at the location B is selected as the picture first encoded.

For convenience of description, the selected picture first encoded may be referred to as the first picture.

Block S203: The terminal selects a reference picture for a second picture from the target group, where the second picture is a picture in the target group other than the first picture.

Specifically, each picture in the target group other than the first picture satisfies a characteristic of the second picture, and the selected reference picture is also from the target group. In an optional solution, the terminal first determines a coded order of each picture in the target group other than the first picture. A picture whose characteristic is closer to the characteristic of the first picture may be ranked closer to the first picture, because the picture whose characteristic is closer to the characteristic of the first picture has a larger possibility of having repeated content with another picture. Subsequently, the another picture may be encoded with reference to the picture ranked front. Alternatively, a chronological order of taking the pictures may be directly a coded order of each picture in the target group other than the first picture. After the coded order is determined, a reference picture for the second picture is selected from pictures whose coded orders are before that of the second picture, and a characteristic of the reference picture and the characteristic of the second picture satisfy a preset screening condition. Optionally, when a reference picture is selected for the second picture, a picture whose characteristic is most similar to the characteristic of the second picture is selected as a reference picture of the picture. For example, the characteristic is specifically time and the screening condition means that a difference between time is minimum. For another example, the characteristic is specifically an angle and the screening condition means that a difference between angles is minimum. For another example, the characteristic is specifically a location and the screening condition means that a distance between two locations is minimum. The rest can be deduced by analogy.

Block S204: The terminal performs motion estimation on the second picture by using the reference picture, to encode the second picture.

Specifically, the terminal may not encode the first picture in the target group with reference to another picture, but another picture in the target group needs to be encoded with reference to a reference picture of the another picture. It is assumed that a reference picture of a picture A4 is a picture B4, the picture A4 includes macroblocks x1, x2, and x3, and the picture B4 includes macroblocks y1, y2, and y3. The macroblock x1 and the macroblock y3 in these macroblocks are most similar (that is, the macroblock y3 is a matching block of the macroblock x1). Therefore, when the picture A4 is encoded with reference to the picture B4, each pixel in the macroblock x2 and the macroblock x3 may be calculated to obtain encoded information, motion estimation is performed on the macroblock x1 to calculate a motion vector from the macroblock x1 to the macroblock y3, and encoded information of the macroblock x1 is obtained based on the motion vector and a residual between the macroblock x1 and the macroblock y3 instead of calculating each pixel in the macroblock x1 to obtain encoded information, so that a data volume of the obtained encoded information is smaller. It may be understood that, a matching block of a macroblock may be calculated by using a block matching algorithm.

In an optional solution, the performing, by the terminal, motion estimation on the second picture by using the reference picture, to encode the second picture is specifically: determining an overlapping area between the reference picture and the second picture based on reference information of a reference picture and reference information of the second picture; determining, in the overlapping area of the reference picture, respective corresponding matching blocks for a plurality of macroblocks of the second picture, where each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture. That is, if the second picture needs to be encoded, the overlapping area between the second picture and the reference picture is determined based on the reference information of the second picture and the reference information of the reference picture for the second picture, and information in the overlapping area on the second picture is basically the same as that in the overlapping area of the reference picture. Therefore, when a macroblock in the second picture is encoded, a probability of finding a matching block of the macroblock by searching the overlapping area of the reference picture is relatively large. Therefore, a range of searching for the matching block of the macroblock is limited to the overlapping area other than all areas of the reference picture, thereby improving efficiency of searching for the matching block. An example is used to perform description below.

Figure 6:
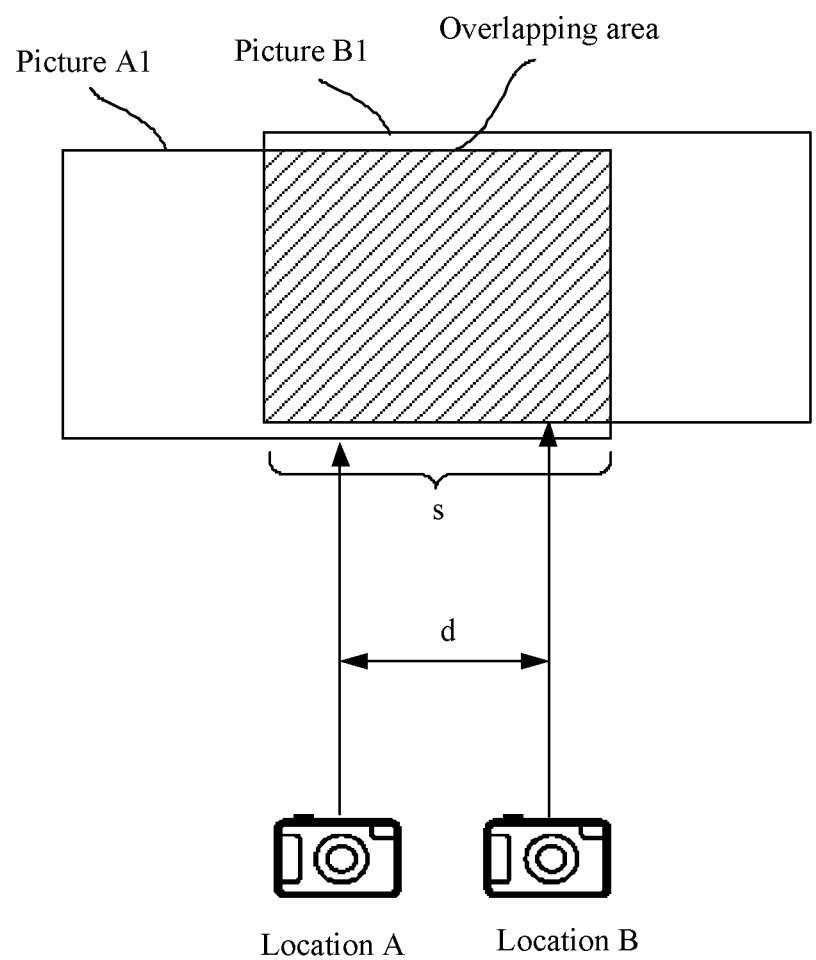
FIG. 6 is a schematic diagram of another scenario of taking photographs at different locations according to an embodiment of the present invention.

Optionally, the reference information includes information about the foregoing location. As shown in FIG. 6, the terminal takes a picture A1 at a location A and takes a picture B1 at a location B, and directions to which the camera points are the same when the terminal photographs at the two locations. Therefore, a distance d between the two locations is obtained based on the two locations, thereby calculating a length s of an overlapping area between the picture A1 and the picture B1 based on the distance d, and then obtaining the overlapping area.

Figure 7:
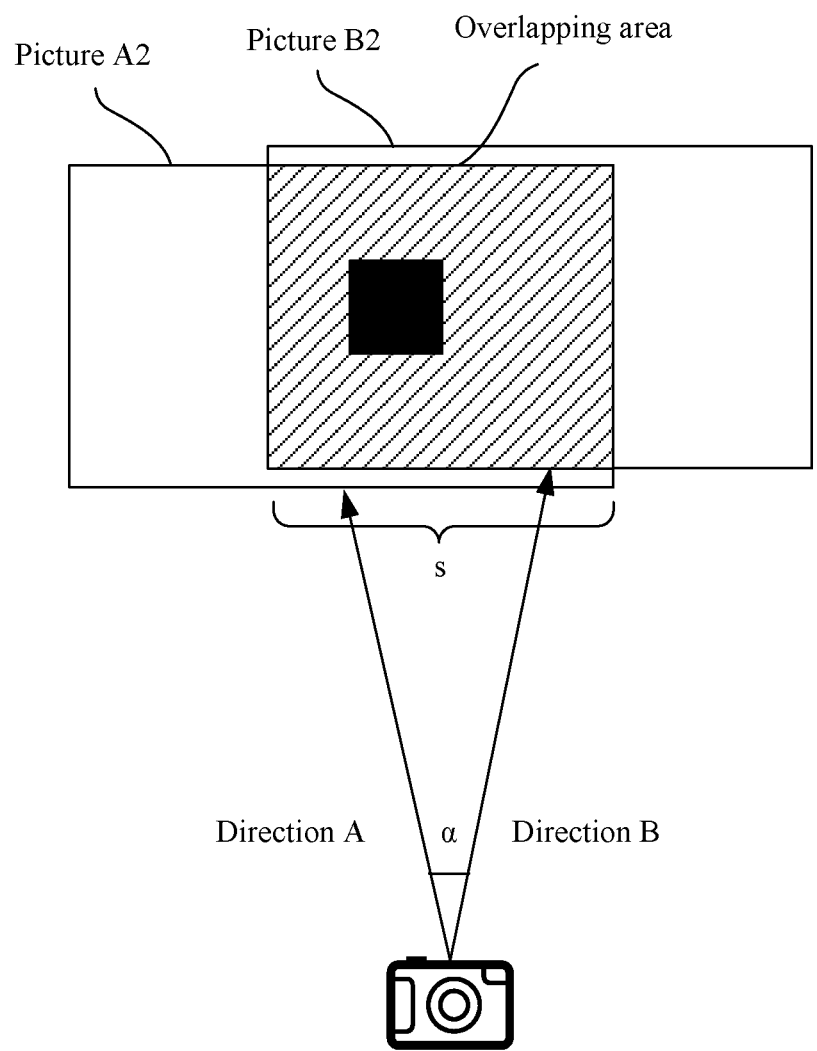
FIG. 7 is a schematic diagram of another scenario of taking photographs from different angles according to an embodiment of the present invention.

Optionally, the reference information includes information about the foregoing location. As shown in FIG. 7, the terminal takes a picture A2 at an angle A and takes a picture B2 at an angle B, and locations of the terminal when photographing at the two angles are the same. Therefore, an angle difference α between the two angles is obtained based on the two angles, thereby calculating a length s of an overlapping area between the picture A2 and the picture B2 based on the angle difference α, and then obtaining the overlapping area.

In the method described in FIG. 2, the terminal performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

The specific process of the method provided in the embodiments of the present invention is mainly described above, and an implementation location and a running status of the method provided in the embodiments of the present invention are described below with reference to FIG. 8 by using an Android operating system as an example. For a more specific method process, refer to the foregoing embodiment.

Figure 8:
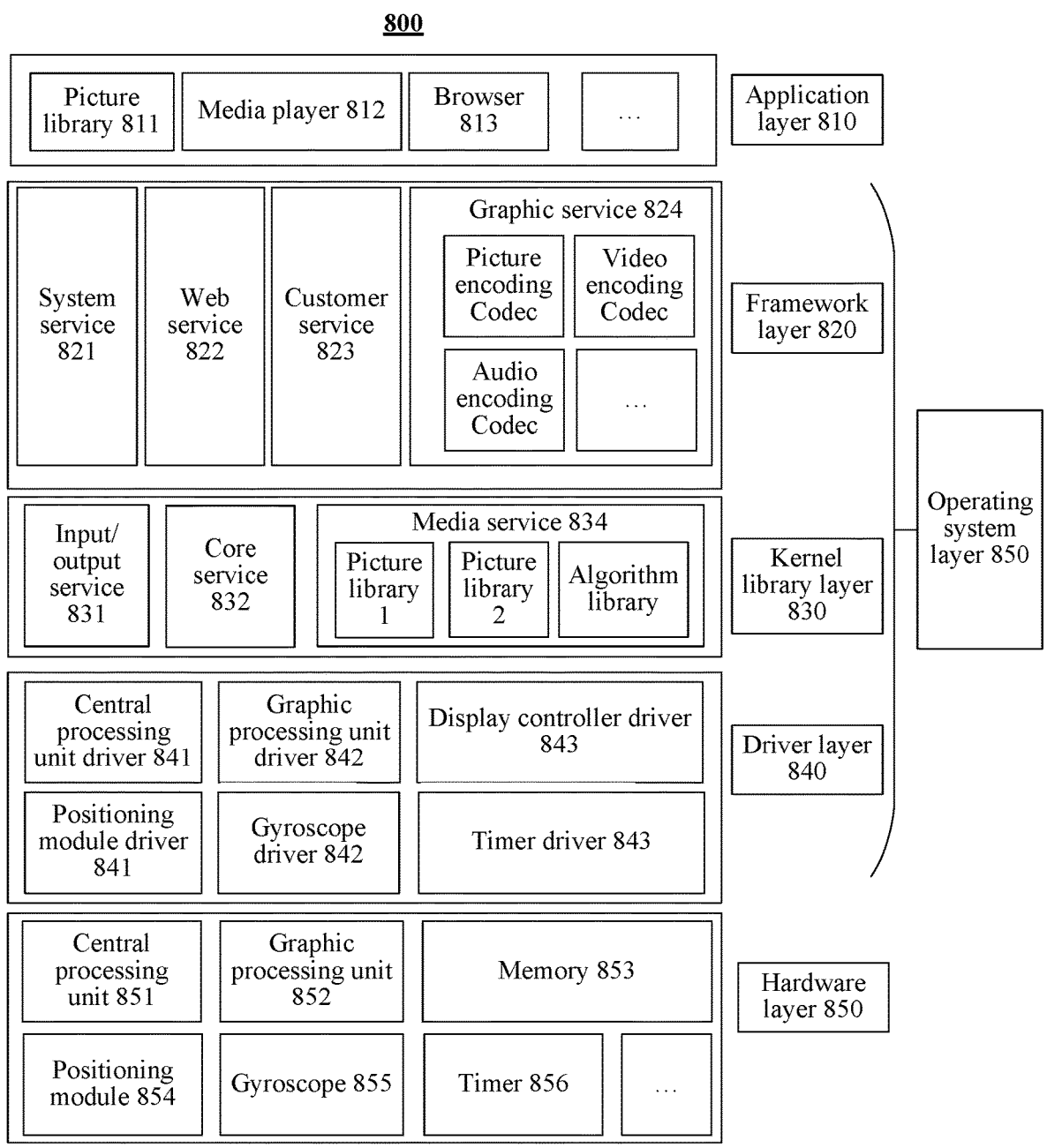
FIG. 8 is a schematic structural diagram of a computer system according to an embodiment of the present invention.

Referring to FIG. 8, FIG. 8 is a schematic structural diagram of a terminal 800 according to an embodiment of the present invention. The terminal 800 may be a device of the embodiments of the present invention. The terminal 800 includes an application layer 810 and an operating system layer 850, and the operating system may be an Android operating system. The operating system layer 850 is further divided into a framework layer 820, a kernel library layer 830, and a driver layer 840. The operating system layer 850 in FIG. 8 may be considered as a specific implementation of the operating system program 182 in FIG. 1, and the application layer 810 in FIG. 8 may be considered as a specific implementation of the application program 181 in FIG. 1. The driver layer 840 includes a CPU driver 841, a GPU driver 842, a display controller driver 843, a positioning module driver 844, a gyroscope driver 845, a timer driver 846, and the like. The kernel library layer 830 is a core part of the operating system and includes an input/output service 831, a core service 832, a media service 834, and the like, the media service 843 includes a picture library 1 of a JPEG format, a picture library 2 of a PNG format, and a picture library of another format, the media service 843 further includes an algorithm library, the algorithm library is used to store picture processing related algorithms in the present invention, for example, an algorithm for selecting a first picture and an algorithm for selecting a reference picture. The framework layer 820 may include a graphic service 824, a system service 821, a web service 822, a customer service 823, and the like. The graphic service 824 may include, for example, a picture encoding codec, a video encoding codec, and an audio encoding codec, and a solution of the present invention is applied to the picture encoding. The application layer 810 may include a picture library 811, a media player 812, a browser 813, and the like.

Additionally, under the driver layer 840, the computer system 800 further includes a hardware layer 850. The hardware layer of the computer system 800 may include a Central Processing Unit (CPU) 851 and a Graphics Processing Unit (GPU) 852 (which is equivalent to a specific implementation of the processor 150 in FIG. 1), may further include a memory 853 (which is equivalent to the memory 180 in FIG. 1), including an internal memory and an external memory, may further include a positioning module 854 (which is equivalent to the positioning module 161 in FIG. 1) and a gyroscope 855 (which is equivalent to the display device 140 in FIG. 1), may further include a timer 856 (which is equivalent to the timer 163 in FIG. 1), and may further include one or more sensors (which is equivalent to the sensor 120 in FIG. 1). Certainly, in addition, the hardware layer 850 may further include the power supply, the camera, the RF circuit, and the WiFi module that are shown in FIG. 1, and may further include other hardware modules not shown in FIG. 1, for example, a memory controller and a display controller.

The foregoing describes the method in the embodiments of the present invention in detail. For ease of better implementing the foregoing solution in the embodiments of the present invention, the following provides an apparatus in the embodiments of the present invention.

Figure 9:
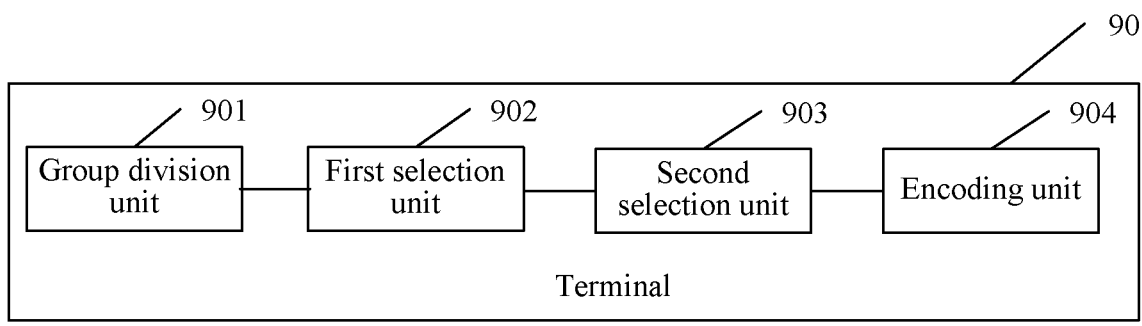
FIG. 9 is a schematic structural diagram of another terminal according to an embodiment of the present invention.

Referring to FIG. 9, FIG. 9 is a schematic structural diagram of a terminal 90 according to an embodiment of the present invention. The terminal 90 may include a group division unit 901, a first selection unit 902, a second selection unit 903, and an encoding unit 904. The group division unit 901 is configured to divide, based on reference information of each of a plurality of pictures, the plurality of pictures into N groups, where the reference information of each picture in a same group satisfies a preset similarity condition, the reference information includes information that is used to describe a characteristic of the picture and that is generated when the picture is taken, and N is greater than or equal to 1. The terminal is configured to encode the N groups of pictures by using a first selection unit, a second selection unit, and an encoding unit, and when any one of the N groups of pictures is encoded, the first selection unit 902 is configured to select a first picture from a target group according to a preset rule, and encode the first picture, where the first picture is a picture first encoded in the target group, and the target group is any one of the N groups of pictures; the second selection unit 903 is configured to select a reference picture for a second picture from the target group, where the second picture is a picture in the target group other than the first picture; and the encoding unit 904 is configured to perform motion estimation on the second picture by using the reference picture, to encode the second picture.

By running the foregoing units, the terminal 90 performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

In an optional solution, the characteristic of the picture includes at least one of a location, an angle, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture. Certainly, the characteristic may further be other information.

In another optional solution, the first selection unit 902 is specifically configured to select, based on reference information of each picture in the target group, the first picture as the picture first encoded, where a characteristic of the first picture satisfies a preset centering condition, and the centering condition includes at least one of the following: location centering in a picture of the target group, angle value centering in a picture of the target group, or time centering in a picture of the target group.

That is, a picture whose characteristic is relatively centered is selected as the first picture as much as possible, so that similarities exist between the first picture and more pictures in the target group. In this way, many macroblocks in the first picture may be used to generate a motion vector of another picture in the target group.

In another optional solution, the second selection unit 903 is specifically configured to determine a coded order of each picture in the target group other than the first picture; and select, based on a characteristic of the second picture, the reference picture for the second picture from pictures whose coded orders are before that of the second picture, where a characteristic of the reference picture and the characteristic of the second picture satisfy a preset screening condition.

That is, a picture whose characteristic is closest to that of the first picture is selected as a reference picture of the first picture. In this way, when the second picture is encoded, more macroblocks in the second picture may be used to generate a motion vector with reference to a macroblock in the reference picture, so that encoded information of the second picture is as little as possible.

In another optional solution, the encoding unit 904 is specifically configured to determine an overlapping area between the reference picture and the second picture based on reference information of a reference picture and reference information of the second picture; determine, in the overlapping area of the reference picture, respective corresponding matching blocks for a plurality of macroblocks of the second picture, where each of the matching blocks is a macroblock that is most similar to one of the plurality of macroblocks and that is in the overlapping area of the reference picture; and calculate a plurality of motion vectors of the second picture based on the plurality of macroblocks in the second picture and the respective corresponding matching blocks of the plurality of macroblocks, to encode the second picture.

That is, an overlapping part between the second picture and the reference picture may be determined based on the reference information, and when a matching block is searched for later, the overlapping part is directly searched for the matching block instead of searching an entire part of the reference picture for the matching block, thereby improving efficiency of searching for the matching block.

For specific implementations of the units in this embodiment of the present invention, further correspondingly refer to the corresponding description of the method embodiment shown in FIG. 2.

In the terminal 90 described in FIG. 9, the terminal 90 performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

Figure 10:
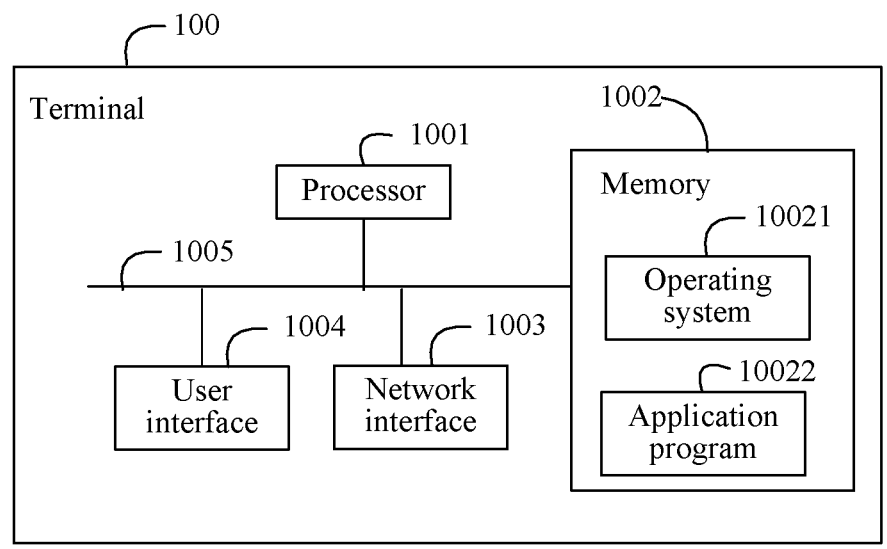
FIG. 10 is a schematic structural diagram of another terminal according to an embodiment of the present invention.

FIG. 10 describes a structure of a terminal 100 provided in an embodiment of the present invention. The terminal 100 includes: at least one processor 1001, a memory 1002, at least one network interface 1003 or another user interface 1004, and at least one communications bus 1005. The communications bus 1005 is configured to implement connection and communication between these components. Optionally, the mobile terminal 100 includes a user interface 1004, including a display (for example, a touchscreen, an LCD, a CRT, a holographic imaging device, or a projector), a keyboard, or a pointer device (for example, a mouse, a trackball, a touch panel, or a touchscreen).

The memory 1002 may include a read-only memory and a random access memory, and provide an instruction and data to the processor 1001. A part of the memory 1002 may further include a non-volatile random access memory (NVRAM).

In some implementations, the memory 1002 stores the following elements: an executable module or a data structure, or a subset thereof, or an extension set thereof.

An operating system 10021 includes various system programs such as the framework layer, the kernel library layer, and the driver layer that are shown in FIG. 8, and is configured to implement various basic services and process a hardware based task.

An application program module 10022 includes various application programs such as the picture library, the media player, and the browser that are shown in FIG. 8, and is configured to implement various application services.

In this embodiment of the present invention, by calling a program or an instruction stored in the memory 1002, the processor 1001 is configured to divide, based on reference information of each of a plurality of pictures, the plurality of pictures into N groups, where the reference information of each picture in a same group satisfies a preset similarity condition, the reference information includes information that is used to describe a characteristic of the picture and that is generated when the picture is taken, and N is greater than or equal to 1; and the processor 1001 encodes the N groups of pictures, where the following operations are performed on each one of the N groups of pictures: selecting a first picture from a target group according to a preset rule, and encoding the first picture, where the first picture is a picture first encoded in the target group, and the target group is any one of the N groups of pictures; selecting a reference picture for a second picture from the target group, where the second picture is a picture in the target group other than the first picture; and performing motion estimation on the second picture by using the reference picture, to encode the second picture.

By performing the foregoing operations, the terminal divides a plurality of pictures into groups based on reference information, first selects, before encoding a picture in a target group, a first picture from the target group as the picture first encoded, then selects a reference picture for each picture other than the first picture, calculates, when encoding a picture other than the first picture, a motion vector with reference to a reference picture of the picture, and generates encoded information of the picture based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

In an optional solution, the characteristic of the picture includes at least one of a location, an angle, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture.

In another optional solution, the selecting, by the processor 1001, a first picture from a target group according to a preset rule is specifically: selecting, based on reference information of each picture in the target group, the first picture as the picture first encoded, where a characteristic of the first picture satisfies a preset centering condition, and the centering condition includes at least one of the following: location centering in a picture of the target group, angle value centering in a picture of the target group, or time centering in a picture of the target group.

That is, a picture whose characteristic is relatively centered is selected as the first picture as much as possible, so that similarities exist between the first picture and more pictures in the target group. In this way, many macroblocks in the first picture may be used to generate a motion vector of another picture in the target group.

In another optional solution, the selecting, by the processor 1001, a reference picture for a second picture from the target group is specifically: determining a coding order of each picture in the target group other than the first picture; and selecting, based on a characteristic of the second picture, the reference picture for the second picture from pictures whose coded orders are before that of the second picture, where a characteristic of the reference picture and the characteristic of the second picture satisfy a preset screening condition.

That is, a picture whose characteristic is closest to that of the first picture is selected as a reference picture of the first picture. In this way, when the first picture is encoded, more macroblocks in the first picture may be used to generate a motion vector with reference to a macroblock in the reference picture, so that encoded information of the first picture is as little as possible.

In another optional solution, the performing, by the processor 1001, motion estimation on the second picture by using the reference picture, to encode the second picture is specifically: determining an overlapping area between the reference picture and the second picture based on reference information of a reference picture and reference information of the second picture; determining, in the overlapping area of the reference picture, respective corresponding matching blocks for a plurality of macroblocks of the second picture, where each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture.

That is, an overlapping part between the first picture and the reference picture may be determined based on the reference information, and when a matching block is searched for later, the overlapping part is directly searched for the matching block instead of searching an entire part of the reference picture for the matching block, thereby improving efficiency of searching for the matching block.

For specific implementations of the units in this embodiment of the present invention, further correspondingly refer to the corresponding description of the method embodiment shown in FIG. 2.

In the terminal 100 described in FIG. 10, the terminal 100 performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

To sum up, by implementing the embodiments of the present invention, the terminal performs group division on a plurality of pictures based on a characteristic described in reference information, where a specific principle is that pictures whose characteristics are similar are divided into a same group; and then selects, from a target group, a reference picture for a second picture in the target group. Because characteristics of pictures in the target group are similar, many similarities exist between the reference picture selected from the target group and the second picture. Therefore, when the second picture is encoded, a motion vector may be calculated with reference to the reference picture and encoded information of the second picture may be generated based on the motion vector, so that a data volume of the obtained encoded information is smaller. Therefore, the encoded information obtained based on this embodiment of the present invention occupies smaller storage space, and when transmitted in a network, the encoded information also occupies fewer network resources.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A picture encoding method, comprising:
dividing, by a terminal based on reference information of each of a plurality of pictures, the plurality of pictures into N groups, wherein the reference information of each picture in a same group satisfies a preset similarity condition, the reference information comprises information that is used to describe a characteristic of the picture including an angle of the picture being taken and the reference information is generated when the picture is taken, and N is greater than or equal to 1; and
encoding, by the terminal, the N groups of pictures, the encoding comprising, for each one of the N groups of pictures:
selecting, by the terminal, a first picture from a target group according to a preset rule, and encoding the first picture, wherein the first picture is a picture first encoded in the target group, and the target group is any one of the N groups of pictures;

selecting, by the terminal, a reference picture and a second picture to be encoded with reference to the reference picture from the target group, wherein the reference picture and the second picture are pictures in the target group other than the first picture; and performing, by the terminal, motion estimation on the second picture by using the reference picture, to encode the second picture.

2. The method according to claim 1, wherein the characteristic of the picture further comprises at least one of a location, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture.

3. The method according to claim 2, wherein the selecting a first picture comprises:

selecting, by the terminal based on the reference information of each picture in the target group, the first picture as the picture first encoded, wherein the characteristic of the first picture satisfies a preset centering condition, and the centering condition comprises at least one of the following: location centering in one or more pictures of the target group, angle value centering in one or more pictures of the target group, or time centering in one or more pictures of the target group.

4. The method according to claim 1, wherein the selecting a reference picture and a second picture comprises:

determining, a coding order of each picture in the target group other than the first picture; and selecting, based on the characteristic of the second picture, the reference picture for the second picture from pictures whose coded orders are before that of the second picture, wherein the characteristic of the reference picture and the characteristic of the second picture satisfy a preset screening condition.

5. The method according to claim 1, wherein the performing comprises:

determining an overlapping area between the reference picture and the second picture based on the reference information of the reference picture and the reference information of the second picture;

determining, in the overlapping area of the reference picture, respective corresponding matching blocks for a plurality of macroblocks of the second picture, wherein each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture.

6. A terminal, wherein the terminal comprises a processor and a memory, the memory is configured to store a program, and the processor calls the program stored in the memory, to perform a picture encoding method, wherein the method comprises:

dividing, by a terminal based on reference information of each of a plurality of pictures, the plurality of pictures into N groups, wherein the reference information of each picture in a same group satisfies a preset similarity condition, the reference information comprises information that is used to describe a characteristic of the picture including an angle of the picture being taken and the reference information is generated when the picture is taken, and N is greater than or equal to 1; and encoding, by the terminal, the N groups of pictures, wherein the encoding comprises, for each one of the N groups of pictures:

selecting, by the terminal, a first picture from a target group according to a preset rule, and encoding the first picture, wherein the first picture is a picture first encoded in the target group, and the target group is any one of the N groups of pictures;

selecting, by the terminal, a reference picture and a second picture to be encoded with reference to the reference picture from the target group, wherein reference picture and the second picture are pictures in the target group other than the first picture; and performing, by the terminal, motion estimation on the second picture by using the reference picture, to encode the second picture.

7. The terminal according to claim 6, wherein the characteristic of the picture further comprises at least one of a location, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture.

8. The terminal according to claim 7, wherein the selecting a first picture comprises:

selecting, by the terminal based on the reference information of each picture in the target group, the first picture as the picture first encoded, wherein the characteristic of the first picture satisfies a preset centering condition, and the centering condition comprises at least one of the following: location centering in one or more pictures of the target group, angle value centering in one or more pictures of the target group, or time centering in one or more pictures of the target group.

9. The terminal according to claim 6, wherein the selecting a reference picture and a second picture comprises:

determining, a coding order of each picture in the target group other than the first picture; and selecting, based on the characteristic of the second picture, the reference picture for the second picture from pictures whose coded orders are before that of the second picture, wherein the characteristic of the reference picture and the characteristic of the second picture satisfy a preset screening condition.

10. The terminal according to claim 6, wherein the performing motion estimation on the second picture comprises:

determining an overlapping area between the reference picture and the second picture based on the reference information of the reference picture and the reference information of the second picture;

determining, in the overlapping area of the reference picture, respective corresponding matching blocks for a plurality of macroblocks of the second picture, wherein each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture.

11. A non-transitory computer-readable storage medium, wherein the medium is configured to store an instruction, and when the instruction is run on a terminal, the terminal is caused to perform a picture encoding method comprising:

dividing, by a terminal based on reference information of each of a plurality of pictures, the plurality of pictures into N groups, wherein the reference information of each picture in a same group satisfies a preset similarity condition, the reference information comprises information that is used to describe a characteristic of the picture including an angle of the picture being taken and the reference information is generated when the picture is taken, and N is greater than or equal to 1; and encoding, by the terminal, the N groups of pictures, wherein the encoding comprises, for each one of the N groups of pictures:

selecting, by the terminal, a first picture from a target group according to a preset rule, and encoding the first picture, wherein the first picture is a picture first encoded in the target group, and the target group is any one of the N groups of pictures;

selecting, by the terminal, a reference picture and a second picture to be encoded with reference to the reference picture from the target group, wherein reference picture and the second picture are pictures in the target group other than the first picture; and performing, by the terminal, motion estimation on the second picture by using the reference picture, to encode the second picture.

12. The medium according to claim 11, wherein the characteristic of the picture further comprises at least one of a location, or time, the location is obtained, through positioning, by a device for taking the picture in a process of taking the picture, the angle is obtained, through detection of a gyroscope, by a device for taking the picture in a process of taking the picture, and the time is obtained, through real-time recording, by a device for taking the picture in a process of taking the picture.

13. The medium according to claim 12, wherein the selecting a first picture comprises:

selecting, by the terminal based on the reference information of each picture in the target group, the first picture as the picture first encoded, wherein the characteristic of the first picture satisfies a preset centering condition, and the centering condition comprises at least one of the following: location centering in one or more pictures of the target group, angle value centering in one or more pictures of the target group, or time centering in one or more pictures of the target group.

14. The medium according to claim 11, wherein the selecting a reference picture and a second picture comprises:

determining, a coding order of each picture in the target group other than the first picture; and selecting, based on the characteristic of the second picture, the reference picture for the second picture from pictures whose coded orders are before that of the second picture, wherein the characteristic of the reference picture and the characteristic of the second picture satisfy a preset screening condition.

15. The medium according to claim 11, wherein the performing motion estimation on the second picture comprises:

determining an overlapping area between the reference picture and the second picture based on the reference information of the reference picture and the reference information of the second picture;

determining, in the overlapping area of the reference picture, respective corresponding matching blocks for a plurality of macroblocks of the second picture, wherein each of the matching blocks is a macroblock that is most similar to one of the plurality of macroblocks and that is in the overlapping area of the reference picture; and calculating a plurality of motion vectors of the second picture based on the plurality of macroblocks in the second picture and the respective corresponding matching blocks of the plurality of macroblocks, to encode the second picture.

* * * * *